H. TURK.
BOTTLE CLOSURE.
APPLICATION FILED MAR. 20, 1911.
1,010,396.
Patented Nov. 28, 1911.
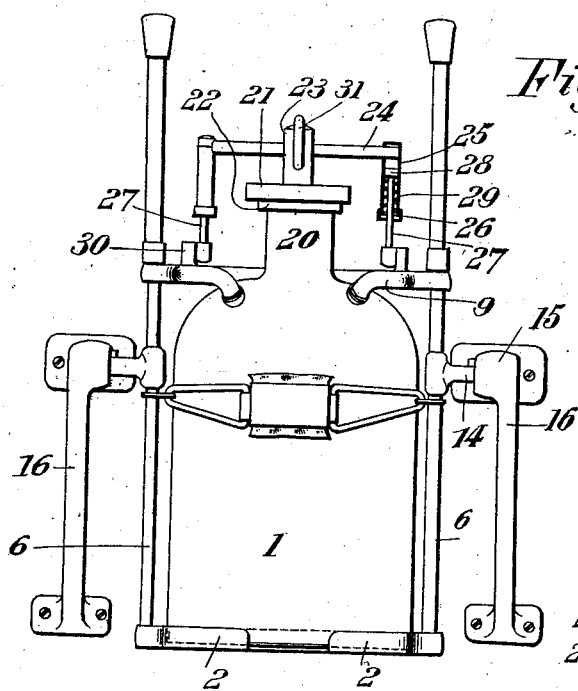
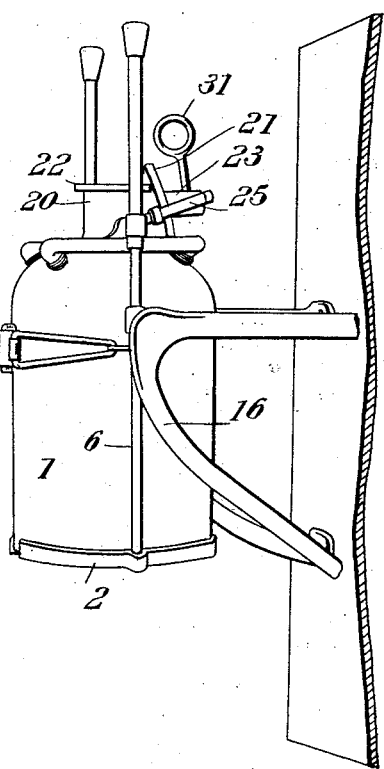
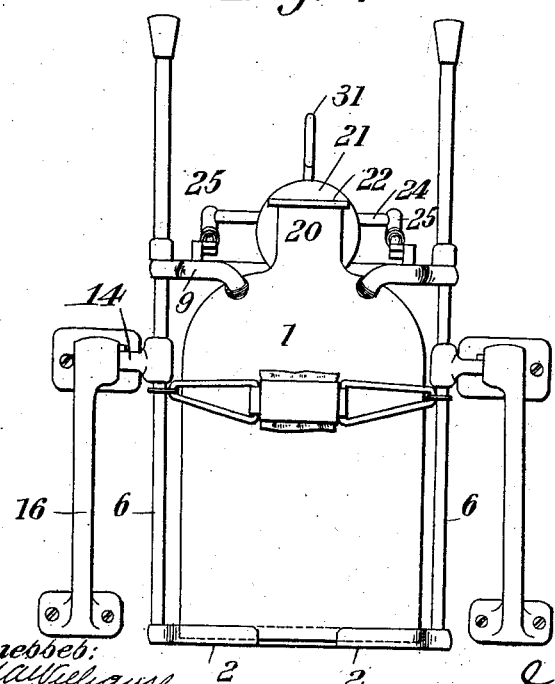
Inventor:
Hugo Turk
Attorney
Witnesses:

UNITED STATES PATENT OFFICE.

HUGO TURK, OF ISERLOHN, GERMANY.

BOTTLE-CLOSURE.

1,010,396.  Specification of Letters Patent.  Patented Nov. 28, 1911.

Original application filed August 22, 1910, Serial No. 578,430. Divided and this application filed March 20, 1911. Serial No. 615,697.

*To all whom it may concern:*

Be it known that I, HUGO TURK, a subject of the Emperor of Germany, and resident of Iserlohn, Germany, have invented certain new and useful Improvements in Bottle-Closures, of which the following is a specification.

This invention relates to bottle closures its object being to provide a device of this kind which allows of the bottle being rapidly and hermetically closed, and is a division of my coöperating application filed Aug. 22, 1910, Ser. No. 578,430.

The accompanying drawings show one form of embodiment of the invention applied to a tilting bottle and in these drawings:

Figure 1 is a front elevation view of a tilting bottle provided with my new closing device, the latter being shown in a closed state. Fig. 2 is an analogous view of the same, the closing device being in an open state while, Fig. 3 shows a perspective side elevation of the bottle and its closure.

The tilting bottle 1 is carried by a metal frame formed by a base ring 2 uprights 6 and an upper ring 9. It is adapted to oscillate by means of pivots 14 in bearings 15 carried by any suitable supporting device 16.

The closing device comprises a plane glass disk 21 which is ground on the upper flat edge 22 of the neck 20 of the bottle. This covering disk 21 carries in the center of its upper surface a head 23 in which the horizontal cross shaft 24 the ends of which are secured into the upper ends of a sleeve 25, is adapted to rotate. The lower end of said sleeve is closed by a nut cap 26 through which passes a piston rod 27 the diameter of which is smaller than the bore of the sleeve 25. Inserted between the bottom of the nut cap 26 and the piston 28 secured inside the sleeve 25 on the end of rod 27 is a coiled spring 29 which has a constant tendency to push the piston 27 into the sleeve.

The piston rod 27 is pivotally connected at its free end with an ear 30 carried by the ring 9 on each side of the neck 20 of the bottle. It will be easily understood that thanks to this spring carrier the closing disk 21 is yieldingly applied on the edge of the neck of the bottle thus securing an instantaneous and tight closing of the latter. When it is desired to open the bottle, it will do to push the cover 21 back by means of the handle 31 with which the head 23 is provided so as to cause it to assume an opened position as shown in Fig. 2, the springs 29 holding the cover in this position.

It is needless to say that various modifications of details may be made in the closing device described above. Thus the closing cover instead of being plane and ground on the edge of the neck, may have any other suitable shape coöperating with a bottle neck having a corresponding shape. The material of which the said closing cover is made may also vary. It may be hard such as glass, hard rubber, celluloid or any other non oxidizable material or soft such as supple india rubber.

Having now fully described my said invention, what I claim and desire to secure by Letters Patent, is:

1. In a bottle closure, the combination of a frame provided with perforated ears, two piston rods pivoted to the ears, pistons on the rods, cylinders in which the pistons operate, springs interposed between the pistons and the ends of the cylinders, a transverse rod connecting the cylinders, and a stopper pivotally mounted on the transverse rod.

2. In a bottle closure, the combination of a ground glass stopper, a transverse rod on which the stopper is rotatably mounted, a frame for supporting the stopper, a telescopic connection pivoted at each end of the rod, a pivotal connection between the opposite ends of the telescopic connections and the frame, and springs for normally drawing the stopper toward the frame.

In testimony whereof I have hereunto set my hand in presence of two witnesses.

HUGO TURK. [L. S.]

Witnesses:
 CHAS. J. WRIGHT,
 ALFRED HENKEL.

---

Copies of this patent may be obtained for five cents each, by addressing the "Commissioner of Patents, Washington, D. C."